（12）United States Patent
Huibers et al.

(10) Patent No.: US 6,726,333 B2
(45) Date of Patent: Apr. 27, 2004

(54) PROJECTION DISPLAY WITH MULTIPLY FILTERED LIGHT

(75) Inventors: Andrew G. Huibers, Mountain View, CA (US); Peter W. Richards, Palo Alto, CA (US)

(73) Assignee: Reflectivity, INC, Sunnyvale, CA (US)

( * ) Notice: Subject to any disclaimer, the term of this patent is extended or adjusted under 35 U.S.C. 154(b) by 0 days.

(21) Appl. No.: 10/052,012

(22) Filed: Jan. 16, 2002

(65) Prior Publication Data

US 2002/0109821 A1 Aug. 15, 2002

Related U.S. Application Data

(60) Provisional application No. 60/267,648, filed on Feb. 9, 2001.

(51) Int. Cl.⁷ .......................... G03B 21/14; G03B 21/00
(52) U.S. Cl. ........................................ 353/84; 353/31
(58) Field of Search ........................... 353/31, 34, 30, 353/84, 122, 32, 33; 348/742, 743

(56) References Cited

U.S. PATENT DOCUMENTS

| | | | | |
|---|---|---|---|---|
| 4,800,474 A | * | 1/1989 | Bornhorst | 362/293 |
| 5,233,385 A | | 8/1993 | Sampsell | |
| 5,448,314 A | | 9/1995 | Heimbuch et al. | |
| 5,592,188 A | | 1/1997 | Doherty et al. | |
| 5,650,832 A | * | 7/1997 | Poradish et al. | 348/743 |
| 5,680,180 A | * | 10/1997 | Huang | 348/656 |
| 5,777,694 A | | 7/1998 | Poradish | |
| 5,784,038 A | * | 7/1998 | Irwin | 345/88 |
| 5,805,243 A | | 9/1998 | Hatano et al. | |
| 5,863,125 A | * | 1/1999 | Doany | 353/84 |
| 6,054,832 A | * | 4/2000 | Kunzman et al. | 318/600 |
| 6,147,720 A | * | 11/2000 | Guerinot et al. | 348/744 |
| 6,334,685 B1 | * | 1/2002 | Slobodin | 353/31 |
| 6,461,001 B2 | * | 10/2002 | Okamori et al. | 353/102 |
| 2002/0105729 A1 | * | 8/2002 | Richards et al. | 359/634 |

OTHER PUBLICATIONS

Unaxis Balzers Limited (Liechtenstein) data sheet, "1x, 2x, and 3x Speed ColorWheels (TM) for Projection, Video, and Imaging Applications", publication date unknown.

* cited by examiner

Primary Examiner—Russell Adams
Assistant Examiner—Andrew Sever
(74) Attorney, Agent, or Firm—Gregory R. Muir

(57) ABSTRACT

A projection system is disclosed that has a light source of multiple wavelengths, a spatial light modulator and projection optics for projecting an image to be viewed by a viewer or to be displayed on a target. Also provided are one or more color sequencing devices which filter the light multiple times. Whether a single or plural color sequencing elements are provided, a single light beam passes at least twice through a sequence of light filters. In one embodiment, two color wheels provide the ability to filter the light multiple times. By changing the physical position or phase of one series of filters relative to another, the brightness and color saturation of the image projected through the projection optics can be changed. The changes in brightness and color saturation can be performed manually by mechanically changing the phase (or position) of the color sequencing device(s) relative to the light beam. Such changes can be performed step-wise of gradually through a continuum of brightness vs. color saturation points.

44 Claims, 22 Drawing Sheets

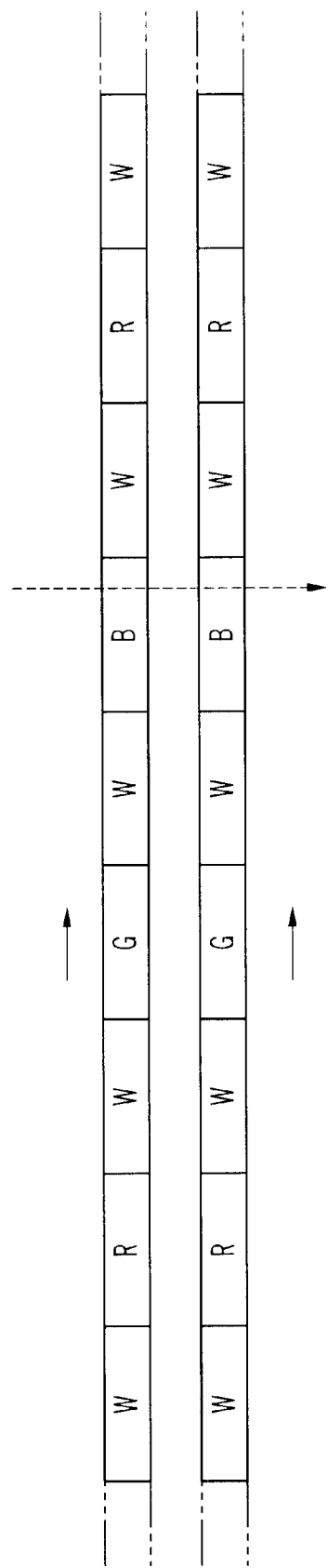

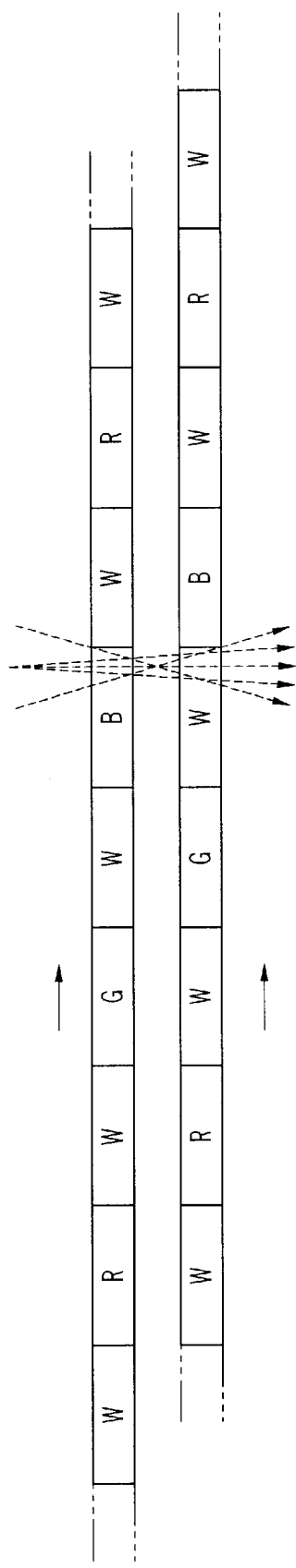
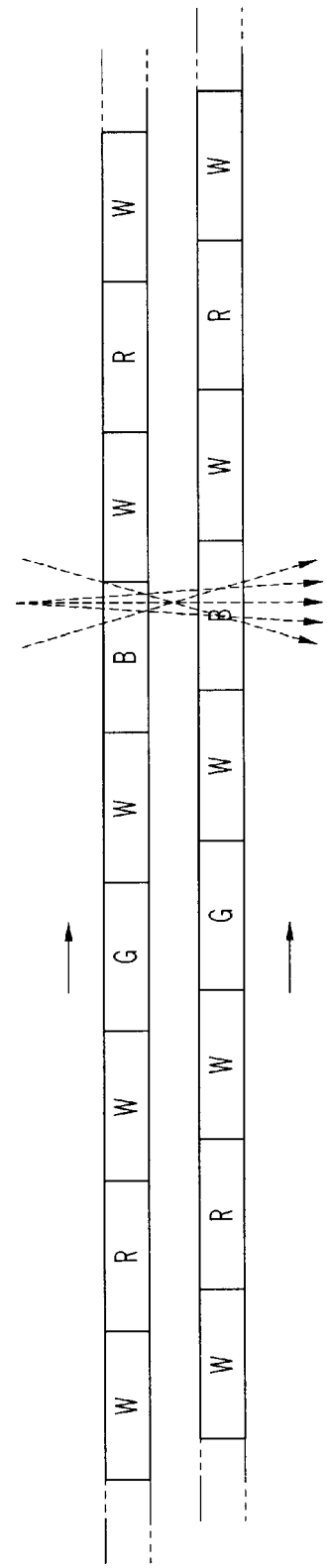
FIG. 8A
FIG. 8B

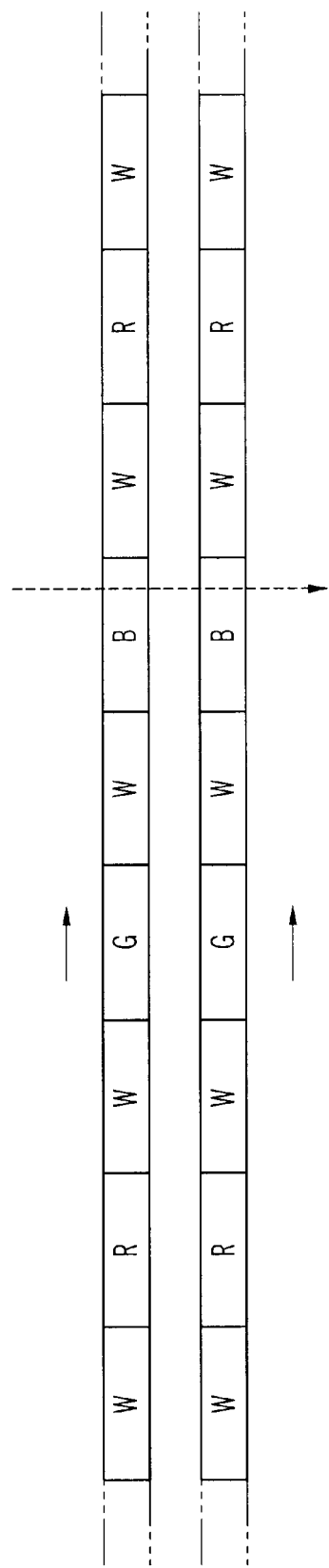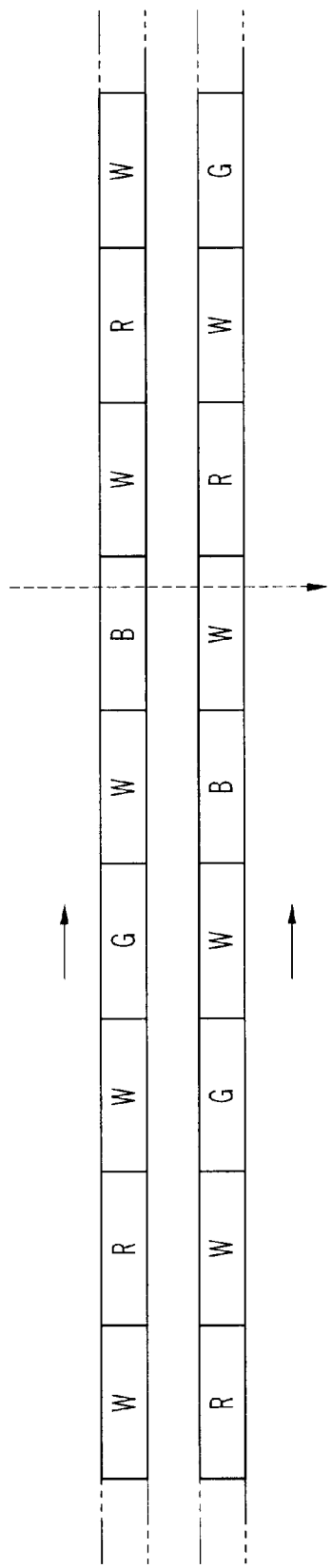

PROJECTION DISPLAY WITH MULTIPLY FILTERED LIGHT

This application claims the benefit of Provisional Application No. 60/267,648 filed Feb. 9, 2001.

BACKGROUND

1. Field of Invention

The present invention relates to novel color filtering for projection systems. More particularly, the present invention relates to a projection system having variable luminosity, a projection system that filters a light beam from a light source multiple times, and novel color wheel designs. The invention is related to U.S. patent application Ser. No. 09/564,069 filed May 3, 2000 to Richards, the subject matter of which is incorporated herein by reference.

2. Related Art

In U.S. Pat. No. 5,680,180 to Huang, a color wheel for a spatial light modulator projection system is disclosed having one green, one red and one blue portion on the wheel. If the color is out of balance, the length of one of the color segments, or the wavelength range of the color segment, can be altered to improve color balance.

In U.S. Pat. No. 5,448,314 to Heimbuch et al., color wheels are disclosed that reduce perceived color separation. One disclosed color wheel has two segments each of red, green and blue, whereas another disclosed wheel has one red, one blue and two green segments.

In U.S. Pat. No. 6,147,720 to Guerinot et al. discloses a projection system with two light sources and a single color wheel. The color wheel can be red, green, blue, cyan, magenta and yellow, or the wheel could be blue cyan and green, or green, cyan, green and blue, depending upon the type of light source and whether the light is reflected or transmitted.

In U.S. Pat. No. 5,650,832 to Poradish et al., discloses a color wheel movable in and out of the path of the light beam, in order to increase brightness of the projected image with a trade-off in color saturation. Also disclosed is a wheel with six segments, three being located radially outward from the other three and having different color saturation values from the inner three segments.

In U.S. Pat. No. 5,233,385 to Sampsell, a color wheel is disclosed that has four segments—green, blue, red and white (clear), with the white segment allowing for adding a base level of brightness, which is not controlled. In U.S. Pat. No. 6,054,832 to Kunzman et al, one or two white segments can be used selectively depending upon the frame brightness.

U.S. Pat. No. 5,868,482 to Edlinger et al. discloses structure and features of a prior art color wheel and projection system, the subject matter of which is incorporated by reference.

SUMMARY OF THE INVENTION

The present invention is directed to unique light filtering systems. In addition, the present invention is directed to a projection system using more than one sequence of light filters passing through a light beam. Also disclosed is a projection system that allows for changing the brightness or color saturation of the projected image by changing the phase between one sequence of light filters and another.

More particularly a projection system is provided that has a light source for providing a light beam; a spatial light modulator for transmitting or reflecting the light beam to a viewer or target; and two or more color filters provided within the path of the light beam so as to filter the light two or more times before reaching the viewer or target. A projection system can have a multiple wavelength light source; a rotatable mechanical color sequencing device; and a spatial light modulator upon which light from the light source impinges before or after passing through the color sequencing device; wherein the color sequencing device is capable of changing the temporal sequence or duration of the colors that are viewed or directed on a target. Also disclosed is an illumination system that includes a light source; two or more time-repeating filters disposed within a light path of light from the light source; a spatial light modulator disposed in the light path; and projection optics for projecting light filtered by the two or more time-repeating filters and modulated by the spatial light modulator.

Methods are also disclosed for directing light of multiple wavelengths from a light source; dividing over time the light from the light source into time segments, the time segments including a plurality of different color segments and a plurality of brightness enhancing segments, the time segments being time sequentially projected onto a spatial light modulator; projecting an image from the spatial light modulator on a target; and changing the time allotted to the brightness enhancing time segments that are projected onto the spatial light modulator so as to increase the brightness of the image projected onto the target. A method is also disclosed for changing the brightness and/or color saturation of a projection system, comprising providing a projection system having a light source, a spatial light modulator, sequentially moving light filters provided two or more times within a light beam from the light source so as to alter light due to the sequentially moving filters into a series of filtered light time segments over time for each sequence of movable light filters, and projection optics, the light source disposed for providing light incident on the spatial light modulator, and the projection optics disposed for receiving light from the spatial light modulator; directing light from the light source through the projection optics via the spatial light modulator; and changing the brightness and color saturation by changing the movement of at least one sequence of moving light filters relative to at least one other sequence of moving light filters.

In another embodiment, a method is disclosed for changing the brightness and/or color saturation of a projection system, comprising providing a projection system having a light source, a color sequencing device, a spatial light modulator, and projection optics, the light source disposed for providing white light, and the projection optics disposed for receiving light from the spatial light modulator; directing light from the light source through the projection optics via the spatial light modulator and one or more color sequencing devices; wherein the light from the light source is white light and the one or more color sequencing devices causes the white light to be divided into different colors and white light, with the different colors and white light being provided sequentially over time; mechanically altering the position or phase of the one or more color sequencing devices so as to gradually increase or decrease the amount of time during which white light is reflected or transmitted from the one or more color sequencing devices to a target.

In yet a further embodiment of the invention a method is disclosed which includes providing a projection system having a light source, a spatial light modulator, and projection optics, the light source disposed for providing white light or light having multiple wavelengths, and the projection optics disposed for receiving light from the spatial light modulator; directing light from the light source through the projection optics via the spatial light modulator; passing the light within the projection system through a first sequence of colors and white light and passing the sequenced light through a second sequence of colors and white light. In a still further embodiment of the invention, a method is disclosed comprising providing a projection system having a light source, a spatial light modulator, and projection optics, the light source disposed for providing white or substantially white light, and the projection optics disposed for receiving light from the spatial light modulator; directing the white light before or after being incident on the spatial light modulator through a color sequencer to result in light of different colors and white light sequenced over time; and increasing color saturation by allotting less time to white light and more time to one or more of the colors.

BRIEF DESCRIPTION OF THE DRAWINGS

FIG. 5C is a schematic of the color segments from FIGS. 5A and 5B passing a beam of light;

FIG. 6C is a schematic of the color segments from FIGS. 6A and 6B passing a beam of light;

FIGS. 8A and 8B are illustrations of a light beam crossing color wheel segments where the color segments are longer than the white segments;

FIG. 16A is an illustration of multiply filtering a light beam through a single color wheel, whereas

DETAILED DESCRIPTION

Figure 1A:
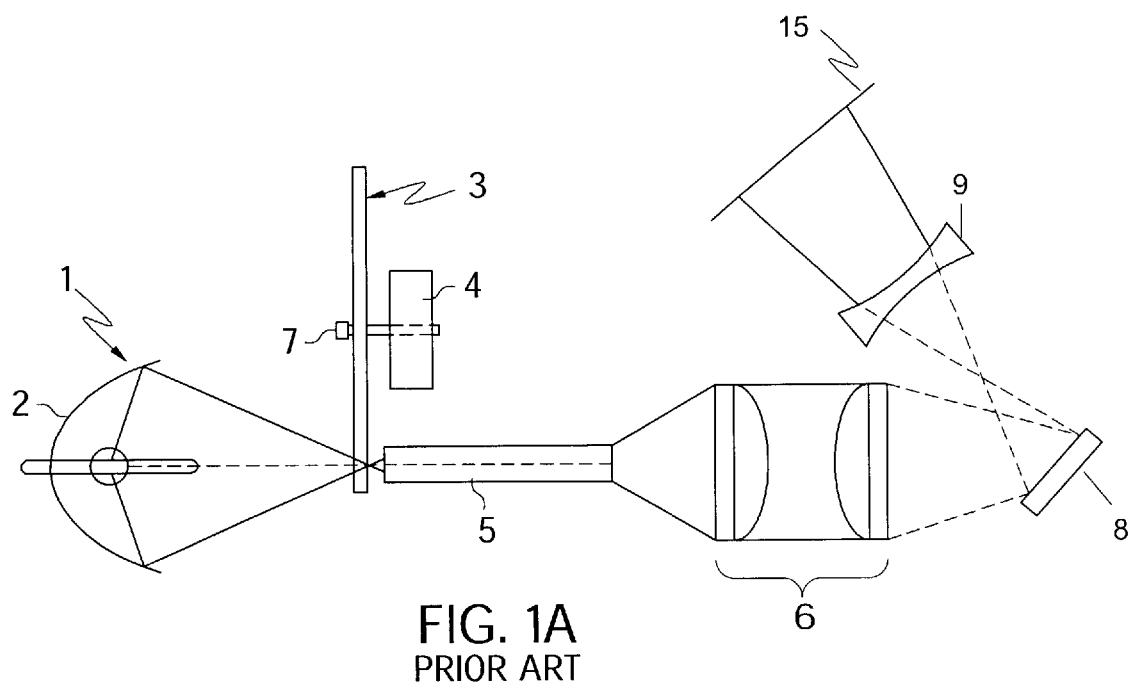
FIG. 1A illustrates an illumination layout of a color field sequential projection system of the prior art (and of one embodiment of the present invention except for the color wheel)
Figure 1B:
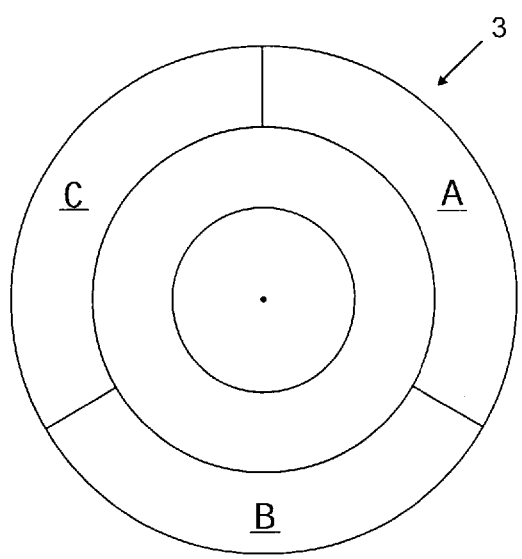
FIG. 1B is an on-axis view of a conventional color wheel for use in a projection system.

As can be seen in the prior art projection system in FIG. 1A, a light source 1 is provided that can be an arc lamp with an elliptical reflector 2 for focusing light onto color wheel 3. A motor 4 rotates the color wheel through the light beam projected from light source 1. A light pipe 5 is provided to homogenize the light distribution across the beam, and optics 6 are provided to direct and project the light beam onto a spatial light modulator 8, such as a micromirror array as set forth in U.S. Pat. No. 6,046,840, the subject matter of which is incorporated herein by reference. After being reflected from the spatial light modulator (or possibly transmitted in liquid crystal embodiment), projection optics (simplified as lens 9) project the image to be directly viewed by a viewer or to a target 15. FIG. 1B is an on-axis view of the color wheel from FIG. 1A. As can be seen in FIG. 1B, a prior art color wheel 3 is circular in cross section and has a central shaft 7 for connecting to the motor. The prior art color wheel typically has three sections, shown as sections A, B and C, which correspond to the colors red, green and blue.

Figure 2A:
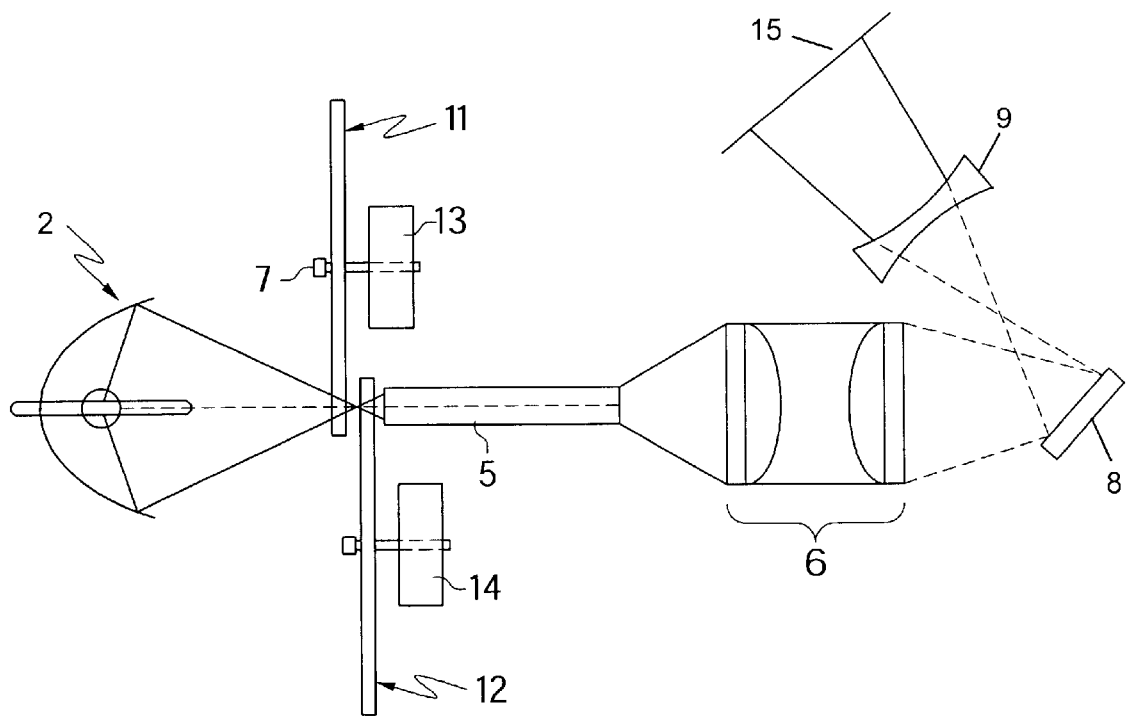
FIG. 2A is a cross sectional view of one embodiment of a portion of the projection system of the invention.
Figure 2B:
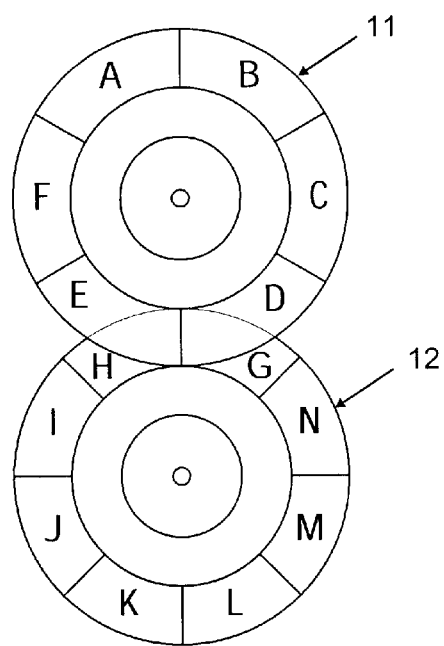
FIG. 2B is an on-axis view of a dual color wheel embodiment of the invention.

FIGS. 2A–4B illustrate various embodiments of the invention. Illustrated are two color filters 11, 12 and a light source 2, and a light pipe/integrator 5. FIG. 2A is an illustration of a portion of one embodiment of a projection system of the present invention (the spatial light modulator, optics and other parts of the projection system having been removed for ease of illustration). A light source 2 is provided, which can be a source of white light such as from a tungsten filament lamp, a xenon arc lamp, or a different type of light source, such as a UHP arc lamp, a halogen lamp, a white light laser, or any other light source with suitable brightness and spectral content could also be used. In the embodiment illustrated in FIG. 2A, two color wheels 11 and 12 are provided (rotated by motors 13 and 14, respectively) that overlap at a converging point of light from light source 10. The two color wheels have axes of rotation that are parallel. In FIG. 2A and in the other embodiments in the drawings, it is desirable that each color wheel in a multi-color wheel embodiment be positioned within the light beam path at some point within the projection system. However, it is not necessary that the color wheels or their axes of rotation be parallel or even positioned proximate to each other. As can be seen in FIG. 2B, color wheel 11 is divided into six segments A through F, and color wheel 12 is divided into six segments G through N. These segment will be discussed further herein.

Figure 3A:
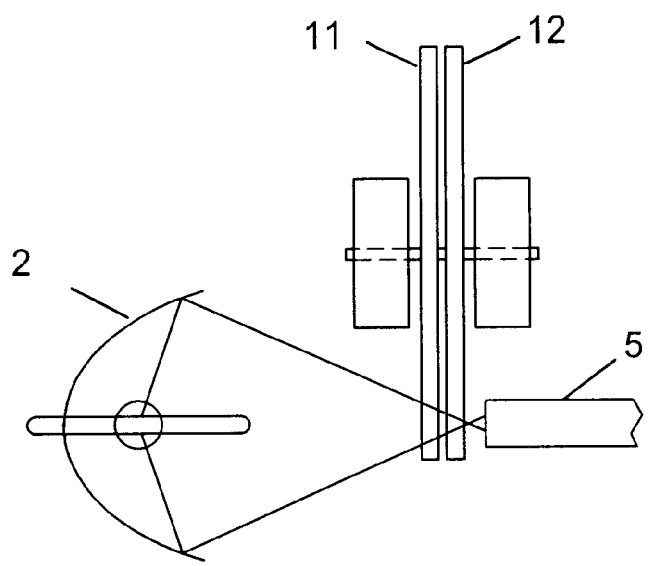
FIGS. 3A, 3B, 4A and 4B are cross sectional views of other embodiments of portions of the projection system of the invention.
Figure 3B:
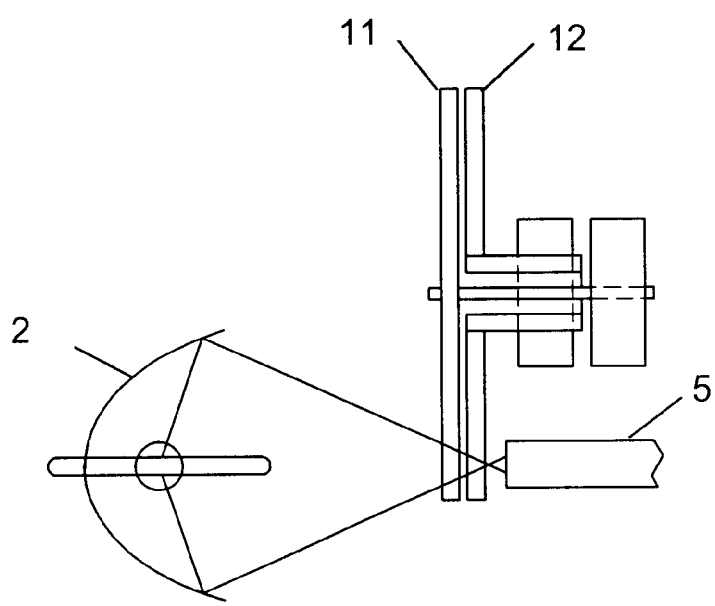

FIGS. 3A, 3B, 4A and 4B are further embodiments of the projection system of the invention. As can be seen in FIG. 3A, a light from source 10 collected by a reflector into light pipe 5 via color wheels 11 and 12 (again rotated by motors 13 and 14, respectively). In this embodiment the color wheels fully overlap with their axes of rotation aligned with each other. In FIG. 3B, color wheels 11 and 12 fully overlap with each other and their drive shafts 17, 18 respectively are coaxial with drive shaft 18 connected to motor 14 and disposed surrounding drive shaft 17 connected to motor 13.

Figure 4A:
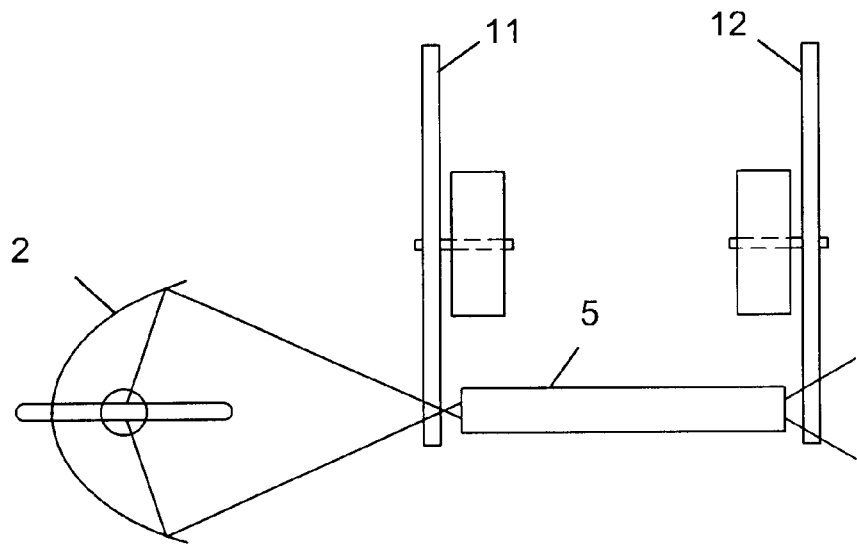
Figure 4B:
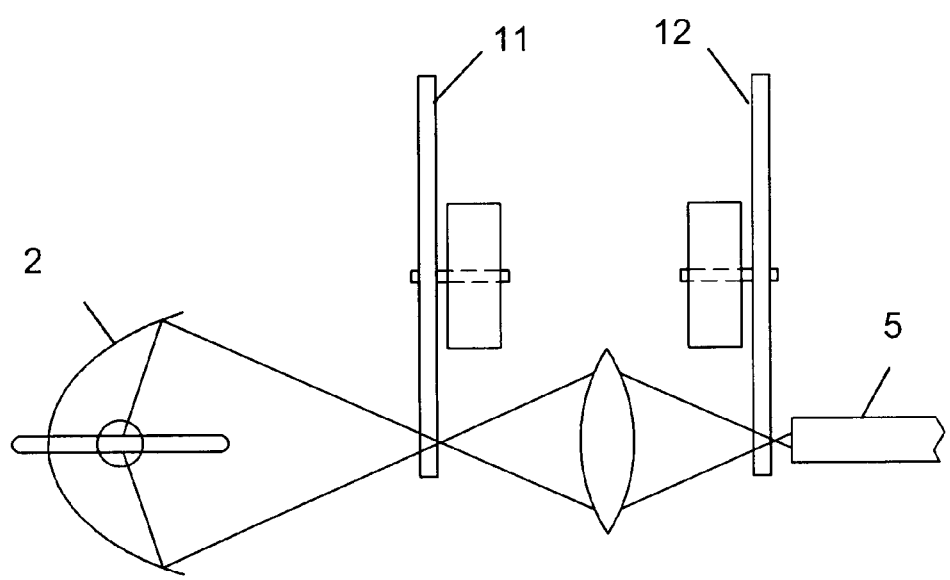

Similarly in FIG. 4A, the color wheels and their axes of rotation are directly aligned, however the wheels are not positioned immediately proximate to each other. It should be noted that the color wheels need not be positioned directly at either end of light pipe 5, but one or both could be placed at other positions along the light beam path, such as adjacent the spatial light modulator before or after the light beam is incident thereon, or even adjacent or within the projection optics of the projection system. Or the light beam could be split by a beam splitter and passed through the color wheels. In any case all or part of the light beam would pass through each color wheel regardless of the position within the projection system. Or, as in FIG. 4B, optics 16 (single or multiple lenses) can be provided between the color wheels so that a focal point of light is at each color wheel position.

In the following figures, color filters are referred to as red, green and blue filters, and the one or more additional filters for changing color saturation and brightness are referred to as white filters. However, it should be noted that this is but one example. The color filters could be cyan, magenta and yellow (if the light beam is reflected off of the filters), and the white filter (fully or predominantly transparent to white light from the light source) could be near white, yellow or even orange. Or, the white segments could be a lighter color of one of the color filters (e.g. light red, light blue and light green).

Figure 5A:
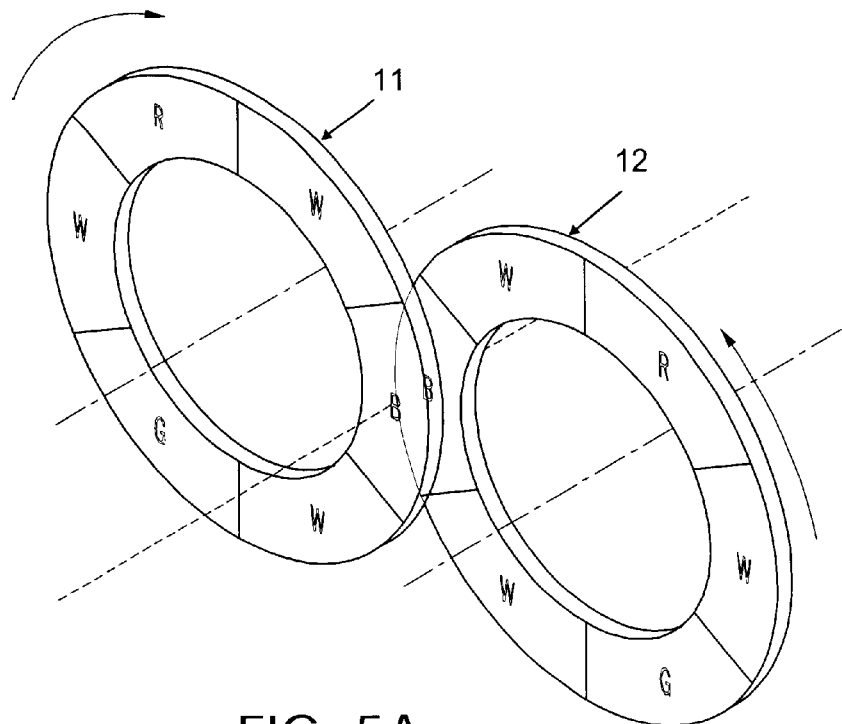
FIGS. 5A and 5B are illustrations of two color wheels which rotate in the opposite and in the same directions, respectively, resulting in increased brightness.
Figure 5B:
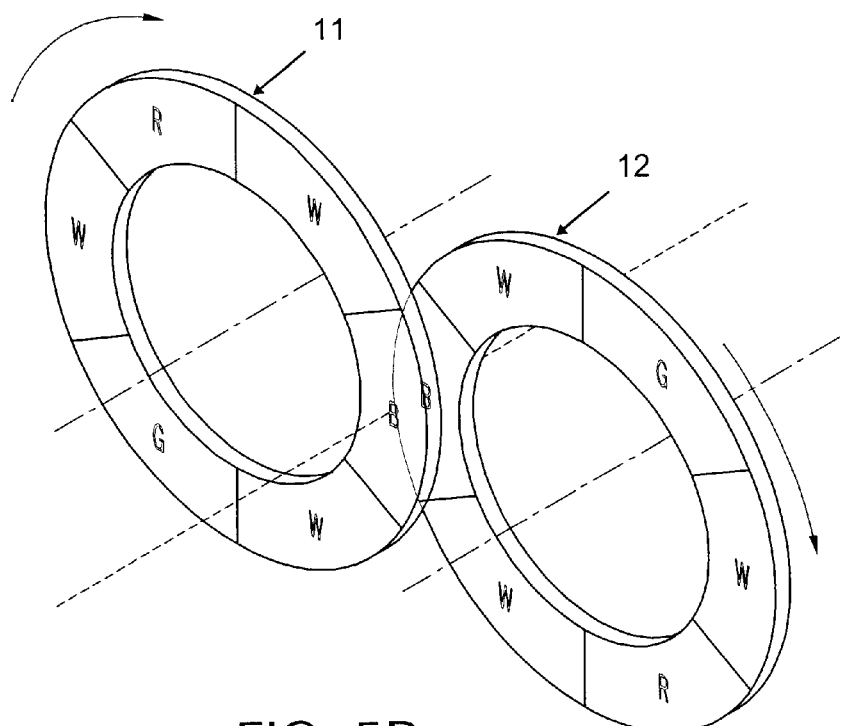

As can be seen in FIG. 5A, the two color wheels can be rotated one clockwise, the other counter clockwise (and in the same direction at the point of overlap), and be synchronized (in phase) such that each color overlaps with the same color of the other color wheel. Because half of each wheel is a white segment, of the total light transmitted through the wheels, one half will be white light. By "white segment" it is meant a segment that allows for the passage of white light. This could be a white colored glass or polymer, a transparent or translucent segment, a missing segment of the wheel, or other design for passing white light and increasing the brightness of the image. FIG. 5B is similar to FIG. 5A, except that the wheels are both rotated clockwise (but in opposite directions at the point of overlap). FIG. 5C is a schematic of the color sections of the two wheels, in phase as in FIG. 5A or 5B, passing through the beam of light. The light beam passes through two blue segments at the same time, two white segments at the same time, two green segments, etc. In this way the total color is not fully saturated, but has increased brightness, due to the white segments passing after every color.

Figure 6A:
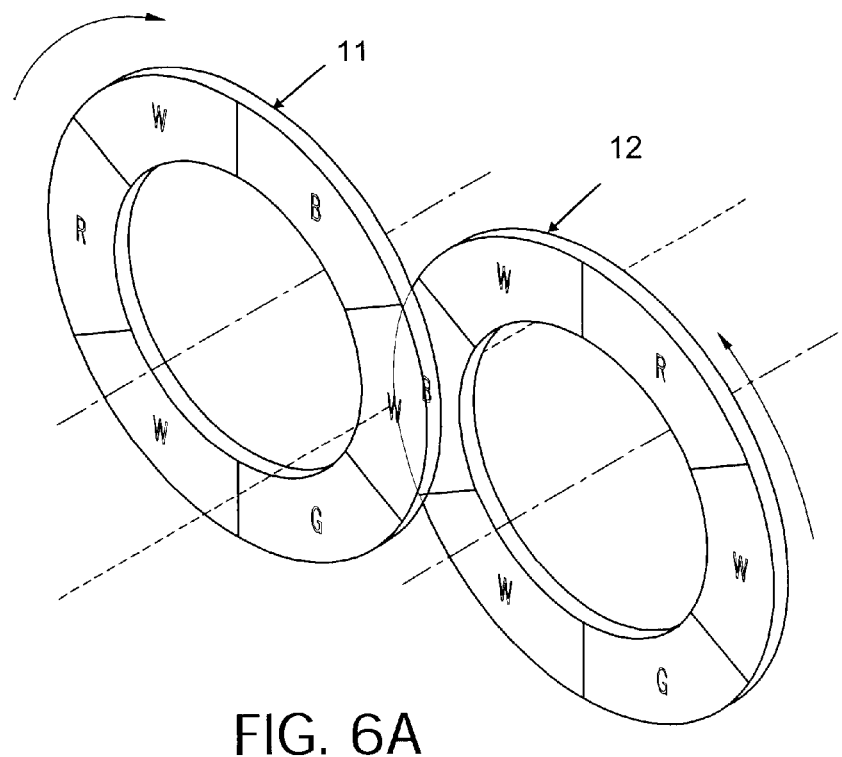
FIGS. 6A and 6B are illustrations of two color wheels which rotate in the opposite and in the same directions, respectively, with a phase difference therebetween resulting in full color saturation.
Figure 6B:
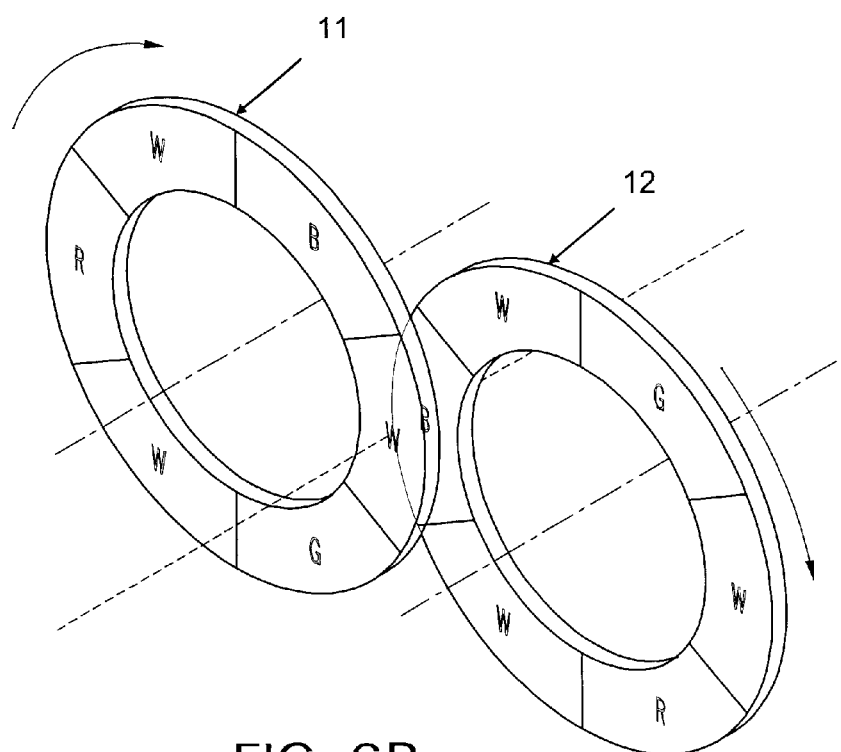

As shown in FIG. 6A, the same wheel configuration is used as in FIG. 5A except that the wheels are not in phase. More particularly, a white segment from each wheel overlaps with a colored segment from the other wheel. In this way, there is full color saturation as there are no double white segments that the light passes through. Likewise in FIG. 6B, the wheels are the same as those in FIG. 5B, except they are not in phase. As with the arrangement of FIG. 6A, no white segment from one wheel overlaps with a white segment from the other wheel. This can be better seen in the schematic of FIG. 6C, where every color segment of a wheel is matched with a white segment of the other wheel. Thus, no white light is transmitted to the viewer or target.

The "½ white" embodiment of FIG. 5 and the fully saturated embodiment of FIG. 6 are the endpoints of a continuum of brightness and color saturation. As the wheel phases are changed from FIG. 5 to FIG. 6, the wheel positions result in a continuous range of increasing color saturation and decreasing brightness. Any of these intermediate positions could be selected by a user of the projection system depending upon the color and brightness desired. This same ability to vary color and brightness would also be present if the white segments are made larger or small that the segments illustrated.

It should be noted that the white segments need not be the same size as the colored segments. The white segments can be any size, though preferably the same size or smaller than the colored segments. In one embodiment, the white segments are from 1/16 to 3/4 the length of the colored segments, and can be from 1/8 to 1/2 the length of the colored segments.

Figure 7A:
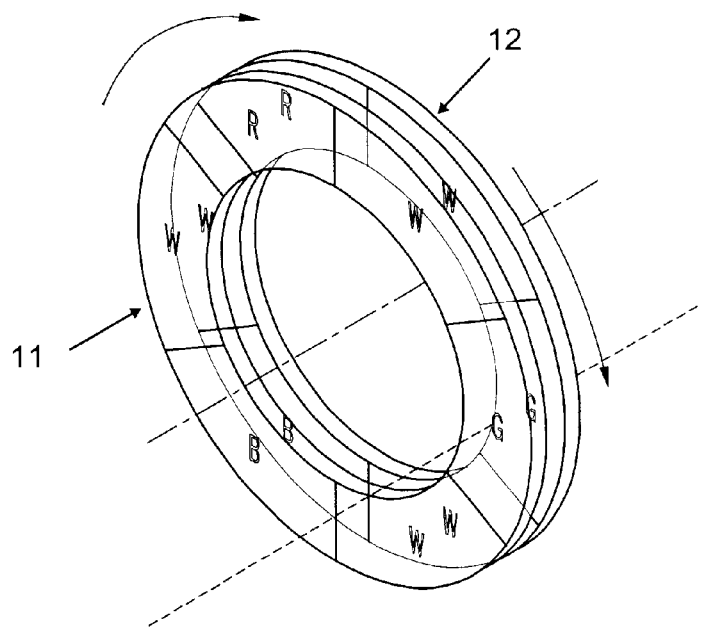
FIGS. 7A and 7B are illustrations of coaxial color wheels.
Figure 7B:
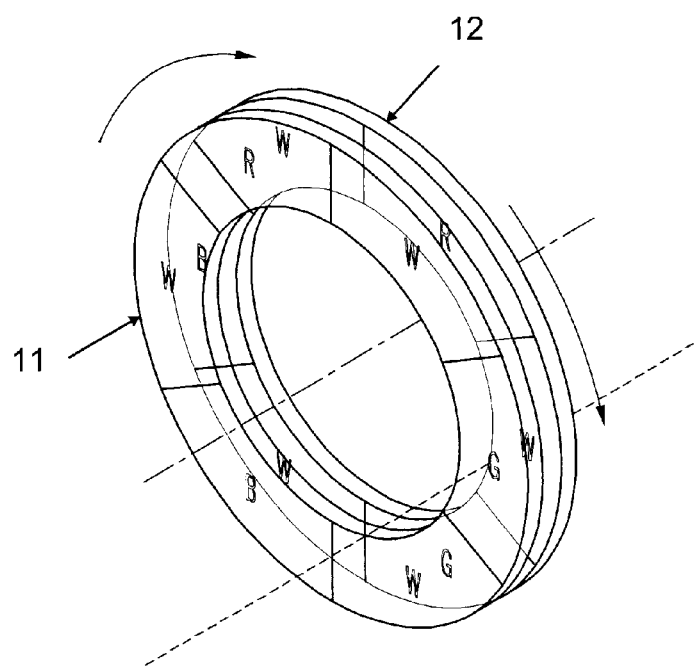

As can be seen in FIG. 7A, the two color wheels could be positioned to be fully overlapping with each other, rather than only at the point of the light beam. As can be seen in FIG. 7A, the color wheels are arranged such that while they rotate each white segment and each color segment of the front wheel overlaps with a white segment and a color segment, respectively, of the rear wheel. By changing the phase of one wheel relative to the other (the phase change being the length of one segment), the result is as illustrated in FIG. 7B. By rotating the wheels in FIG. 7B in this configuration, full color saturation can be achieved (as in FIGS. 6A and 6B). It is also possible to change the locations of the colored segments in one wheel and rotate the wheels in opposite directions, though rotation in the same directions is preferred. The color wheels of FIGS. 7A and 7B can be rotated as in the configurations of FIGS. 3 and 4.

In reality, the light beam has a finite extent in space and angle. Therefore, in order to avoid partial white segments for the full color saturation embodiments, it is preferable to provide color segments longer than the white segments. As can be seen in FIG. 8A, colored segments that are longer than white segments prevent any portion of the width of the light beam from passing through two white segments when in full color saturation mode as in FIG. 8A. FIG. 8B is a schematic of the same color wheels of FIG. 8A but in a different phase position (greater brightness, less color saturation).

Figure 9A:
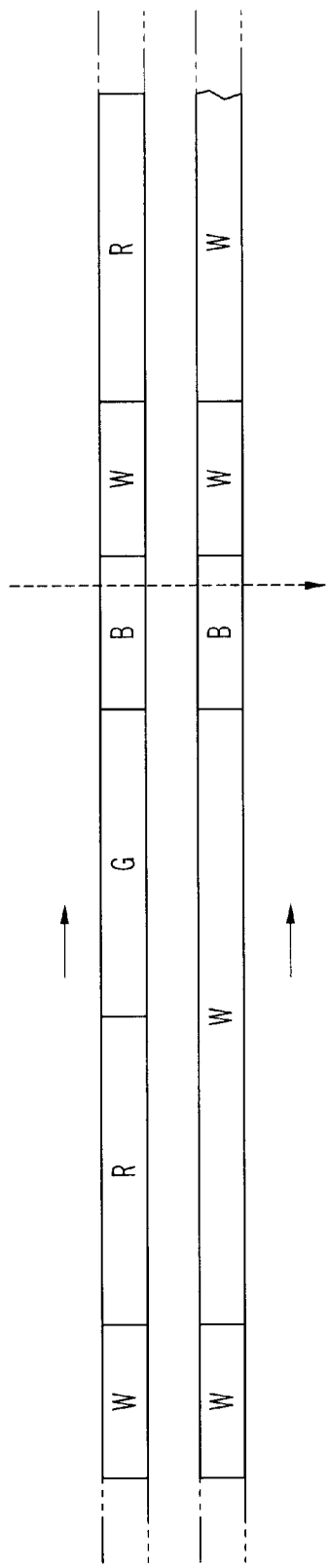
FIGS. 9A and 9B are illustrations of a light beam crossing color wheel segments where only one of the colors undergoes a saturation change.
Figure 9B:
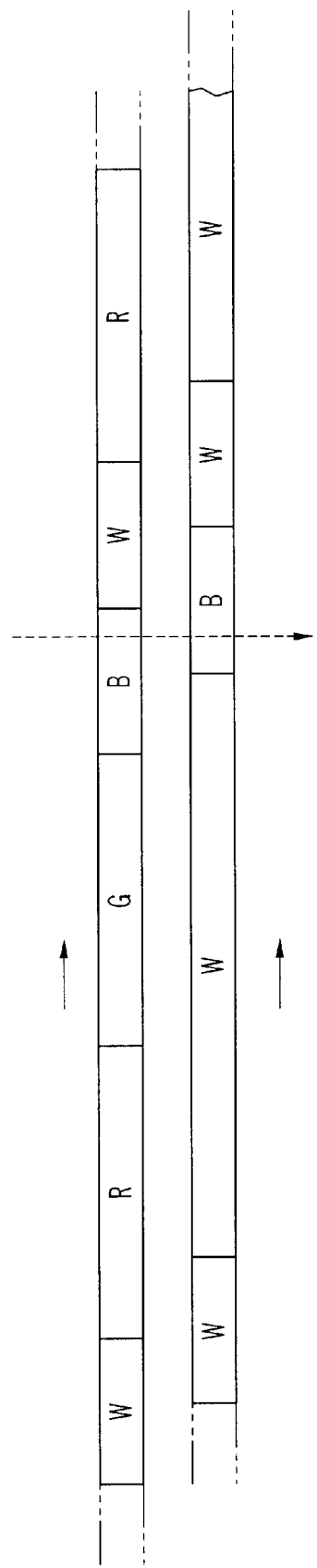

It is not necessary that all colors on the color wheel have their brightness vs. color saturation changed as in the above embodiments. It may be desirable to have only one or two (or more than three if additional colors are used) colors be variable for luminosity and color saturation. One example is shown in FIGS. 9A and 9B where a phase shift between the two color wheels results in decreased brightness and increased color saturation only for the color blue.

Figure 10:
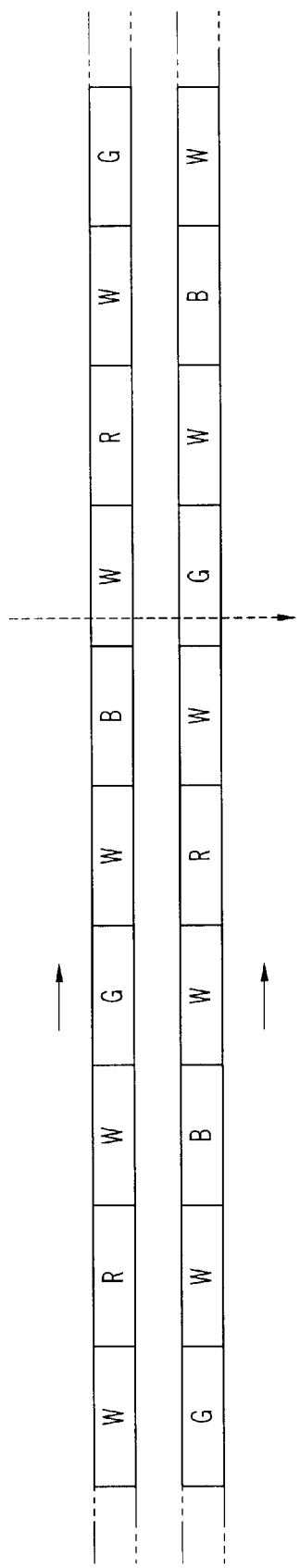
FIG. 10 is an illustration of how a dual color wheel embodiment can be used to double the frame rate of a projection system.

It is also possible to increase the frame rate with a multi color wheel embodiment. The phase between two color wheels (e.g. those of FIGS. 4 to 6) can be changed by more than a single segment (e.g. by rotating one wheel approximately 180 degrees relative to the other wheel) so as to result in the passage through the light beam of each color twice for each revolution of the two wheels. This is shown in the schematic of FIG. 10. In this way, it is possible for a projection system to have the flexibility of alternating between a single frame rate and a double frame rate.

Figure 11:
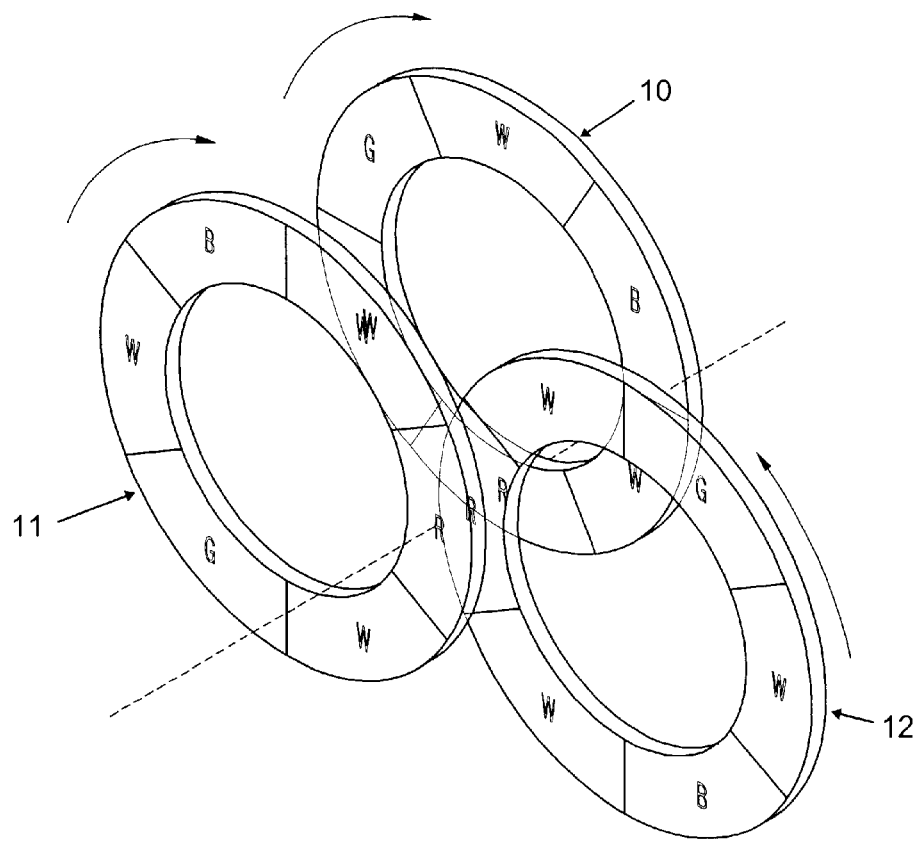
FIG. 11 is an illustration of an embodiment using three color wheels.

It is also possible to utilize more than two color wheels for a single spatial light modulator. FIG. 11 is one example where brightness and color saturation can be varied by using three color wheels 10, 11 and 12, and where the frame rate can be doubled or tripled. Of course, the color wheels could be disposed as in FIG. 11, or as fully overlapping with each other, or at different points in the projection system (as mentioned above with respect to the two color wheel embodiments).

Figure 12A:
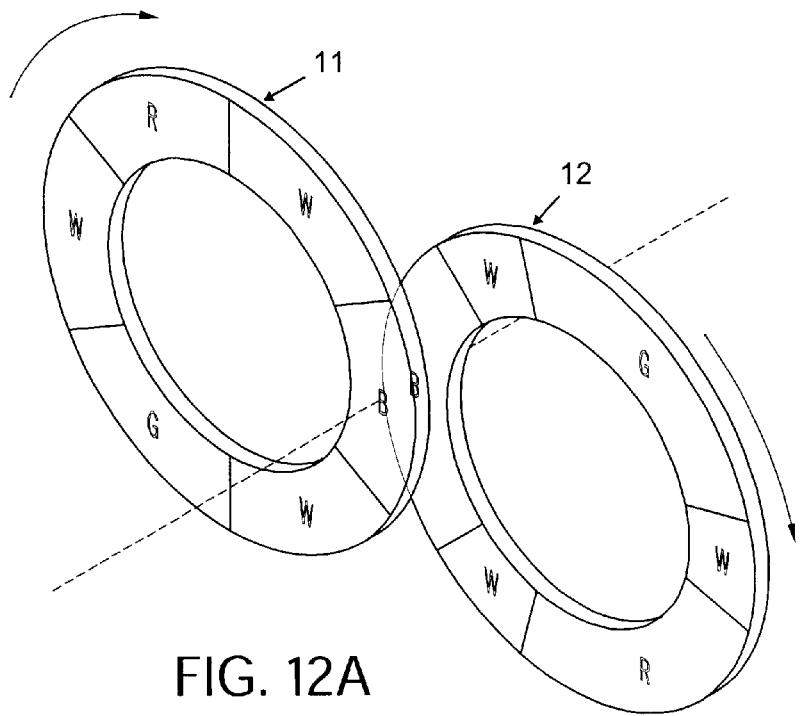
FIG. 12A is an illustration of a dual color wheel embodiment where the white segments are not the same length on each wheel.
Figure 12B:
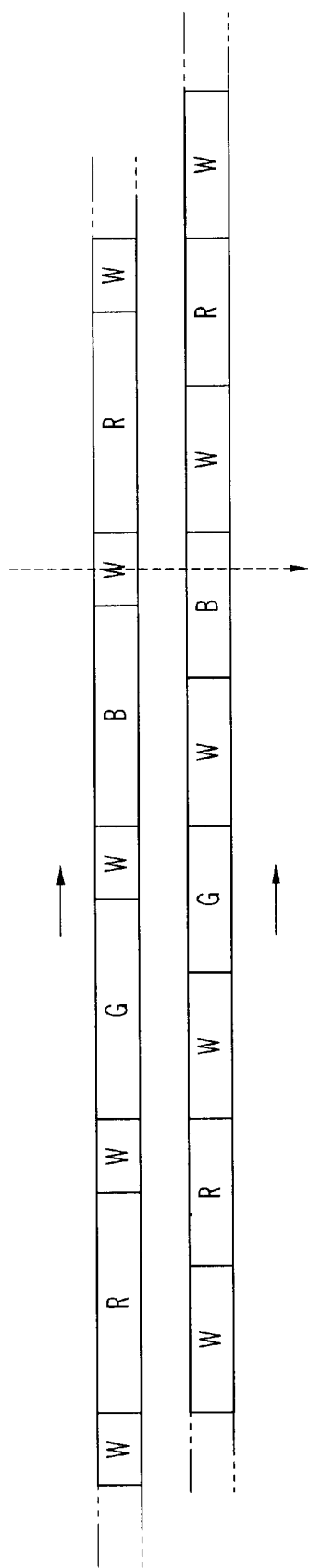
FIG. 12B is a schematic of the color wheel segments of FIG. 12A passing a beam of light.

It should also be noted that the color wheels need not have white segments of the same length. The white segments can have different lengths within the same wheel, or, as in FIG. 12A, the white segments on one wheel can be of a different length than the white segments on the other wheel. The schematic of the colors of the two color wheels of FIG. 12A is shown in FIG. 12B. Also, the color wheels need not be limited to red, green and blue as in the above embodiments. It is possible to expand the color gamut from the traditional RGB triangle to include one or more additional colors, such as cyan, magenta and/or yellow, with each color optionally having a white segment proximate thereto. A specific embodiment is to have four colors, e.g. red, yellow, green, blue, so that more of the color gamut perceivable by the human eye can be produced. This may be useful in a system where color reproduction is particularly important, for example in pre-press proofing. Or, the red, green and blue filters could be entirely substituted with other filters, such as cyan, magenta, yellow and/or other filters (e.g. for an embodiment where the light beam is reflected off of at least one of the color wheels).

Figure 13A:
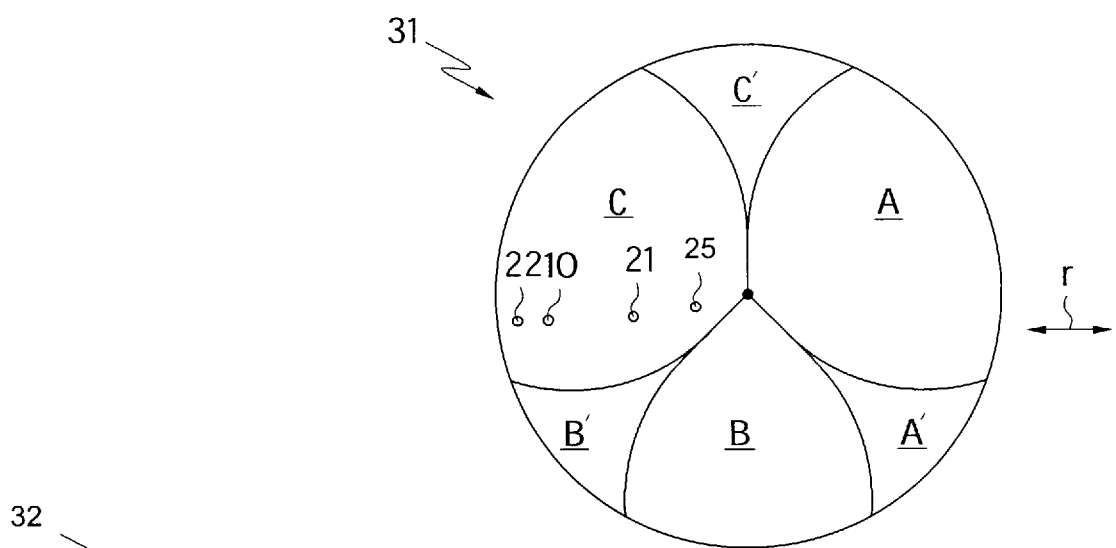
FIGS. 13A to 13C are illustrations of color wheels capable of fully saturated and less than fully saturated color due to translational movement of the wheel.
Figure 13B:
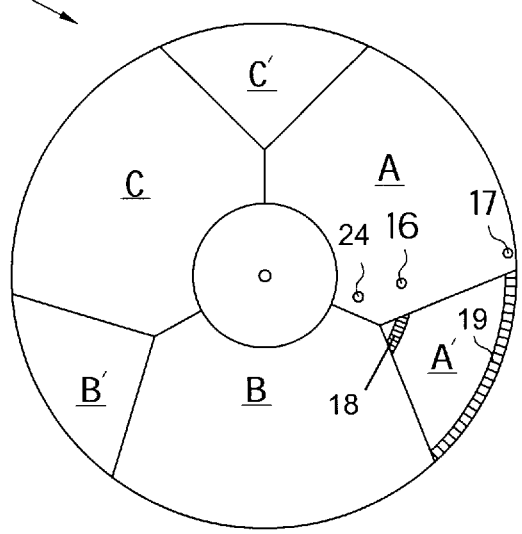
Figure 13C:
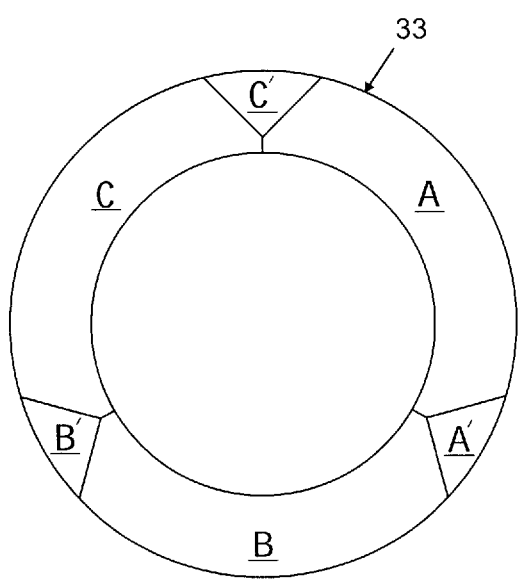

FIGS. 13A to 13C are illustrations or color wheels for use in a single color wheel projection system. These two wheels also provide the ability to alter the color saturation vs. brightness by shifting the wheel in a radial direction within the light beam. This allows full color saturation when the light beam is projected through the wheel radially inward (e.g. near the center of the wheel) and also allows increased brightness as the wheel is moved to allow the light beam to pass through a more circumferential part of the wheel. Of course, as with the other embodiments, there need not be a white segment for each color, the white segments need not each be of the same length, and there need not be only three colors. And, the one or more white segments can extend to the center of the wheel (so that there would not be a full color saturation embodiment), however it is desirable that the sides of the white segment(s) not be radii of the circle (or only lie on the radius for part of the wheel) so as to allow for changing the brightness and color saturation.

More particularly, as can be seen in FIG. 13A, a color wheel 31 having color wheel filter segments A, B and C are provided, which can correspond to light centered around a different wavelength for each segment. As an example, segments A, B and C could correspond to red, green and blue filters. Additional filter segments for providing colors could be used (e.g. segments A, B, C and D) where the additional one or more colors could be an additional color or spectral distribution, e.g., for expanding the color gamut or increasing brightness or both. Or, if the wheel is used for reflection, the wheel segments could be yellow, magenta and cyan.

As can also be seen in FIG. 13A, a color wheel 31 additional segments A', B' and C' are provided for altering the luminosity vs. color saturation of the image transmitted or reflected from the color wheel. Segments A', B' and C' could be white segments (e.g. transparent segments for passing white light from the white light source), or highly reflective segments (e.g. mirror segments) for the reflection embodiment. Not only "white" segments could be used for segment A', B' and C'. Segments that correspond to segments A, B and C but that have higher luminosity and lower color saturation, or that have a lower luminosity and higher color saturation, could be used. For example, segment A' could be a filter that passes all red wavelengths and less than all of green and blue; segment B' could be a filter than passes all green wavelengths and less than all of blue and red; and C' could be a filter that passes all blue wavelengths and less than all of red and green. In appearance filters A', B' and C' could be pink, light blue and light green, or otherwise pastel in color depending upon the wavelengths selected.

As can be further seen in FIG. 13A, if the wheel is rotated around central point (drive shaft) 7, a light beam 15 will pass through only segments A, B and C. Assuming segments A, B and C are the lower luminosity, higher color saturation segments (rather than segments A', B' and C'), then the image projected through the wheel will have full color saturation, or at least high color saturation depending upon the filters selected. If the wheel is moved (e.g. radially in direction "r") so that it passes through the wheel at point 11, then a small portion of color wheel segments A', B' and C' will pass across the light beam. If these segments A', B' and C' are white segments or segments of less saturated color and higher luminosity, then the output image will be brighter (though less saturated in color) due to this positional change of the color wheel. Because the filter segments having the different luminosity and color saturation (A', B' and C') do not occupy the same percentage of the wheel from point 25 to point 22 (that is, along the radius of the color wheel), moving from 25 to 22 allows a different, possibly brighter group of colors to be selected.

Likewise in FIG. 13B, a color wheel 32 is provided with segments A', B' and C' that each occupy a lower percentage of the wheel (circumferentially) at a radially inward part of the wheel compared to a radially outward part of the wheel. Taking wheel segment A' as an example, a light beam 16 will pass through portion 18 of segment A', whereas a light beam 17 will pass through portion 19 of segment A'. Because portion 19 is a greater percentage of the circle of which it is a segment, than portion 18 is of the circle of which portion 18 is a segment, the relative movement of the light beam from point 16 to point 17 will allow for more time per frame allotted to segment A'. Thus, if segments A, B and C are red, green and blue, and segments A', B' and C' are white (transparent) segments, then a light beam passing through the color wheel at point 24 can result in a fully color saturated frame (one frame being equal to one rotation of the wheel) where no white segments pass through the light beam—whereas a light beam passing through the color wheel at point 17 can result in higher brightness of the frame, though with a corresponding decrease in color saturation. FIG. 13C is similar to FIG. 13B, but shows a more traditional ring-like color wheel 33 as often used in color projection systems. Though any size is possible, a diameter of from 40 to 140 mm is preferred, with a motor that allows for an operating speed of from 3600 rpm to 10800 rpm (other speeds are possible as long as they are sufficiently fast so that the sequential colors appear as a combined color when viewed.

Figure 14A:
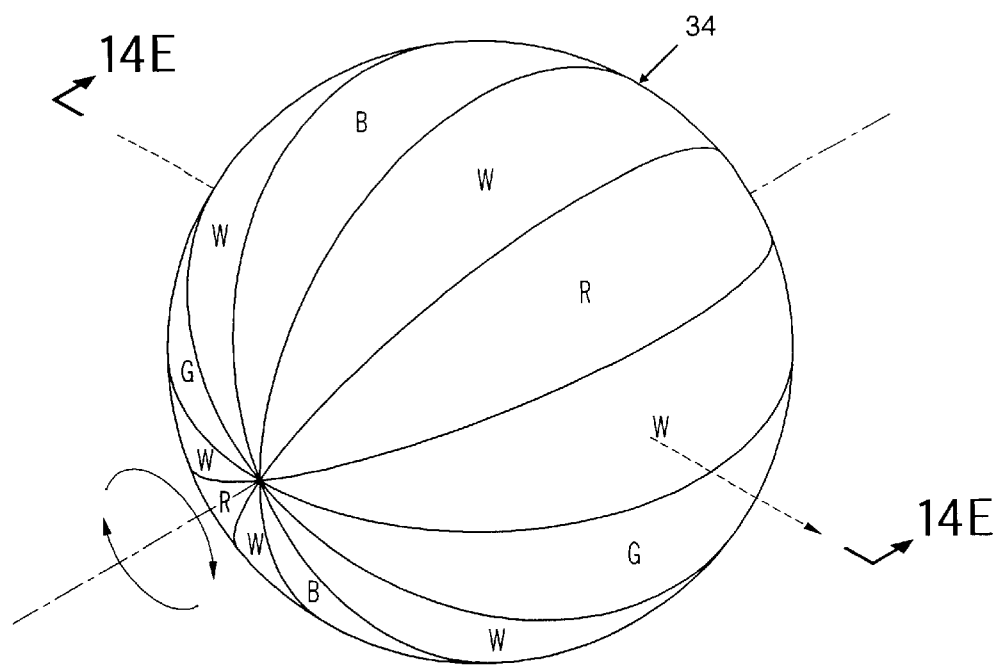
FIGS. 14A and 14B are views of the front and back sides of a spherical color filter.
Figure 14B:
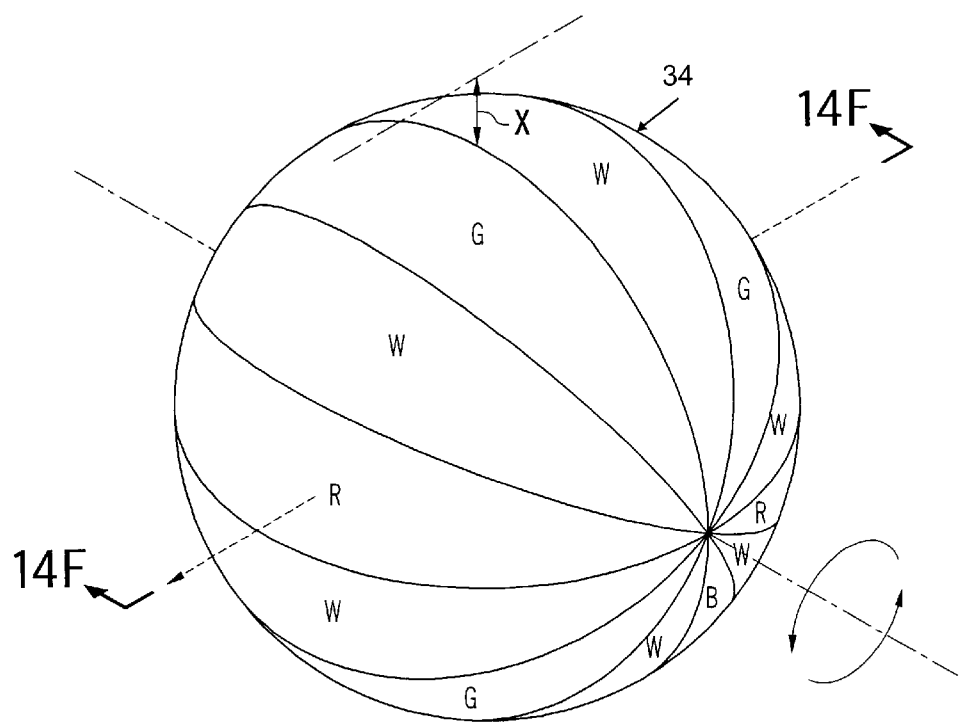
Figure 14E:
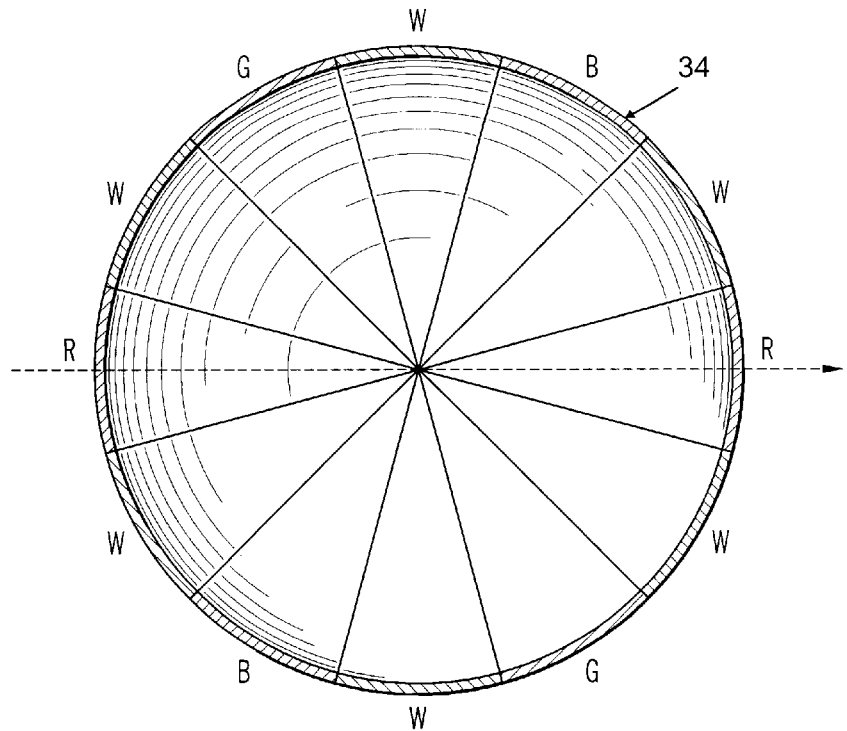
FIG. 14C illustrates the shifting of the sphere to obtain changes in luminosity and color saturation.
Figure 14F:
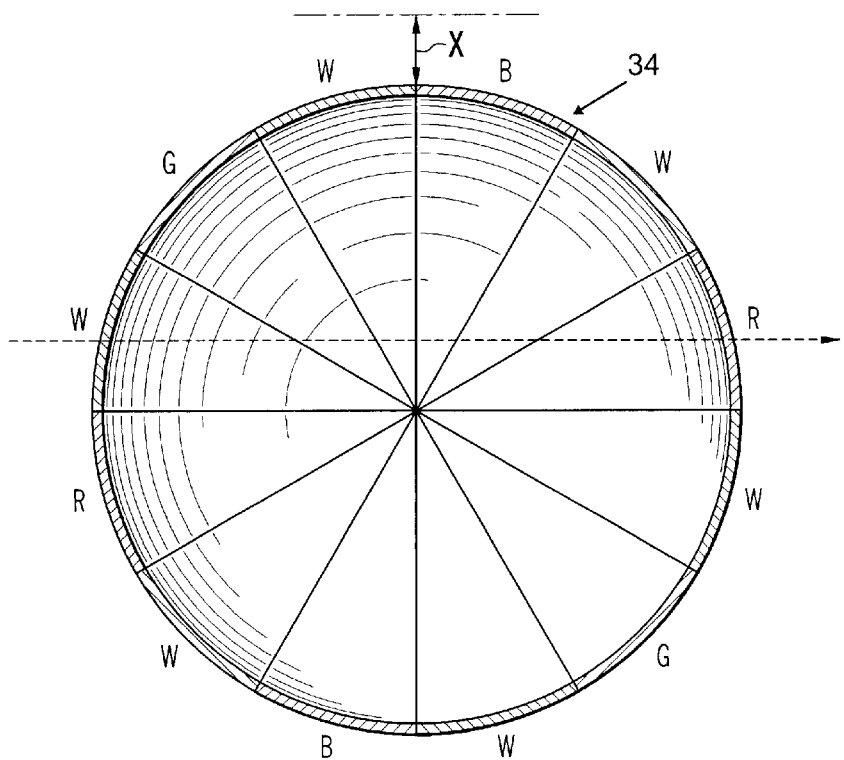
Figure 15A:
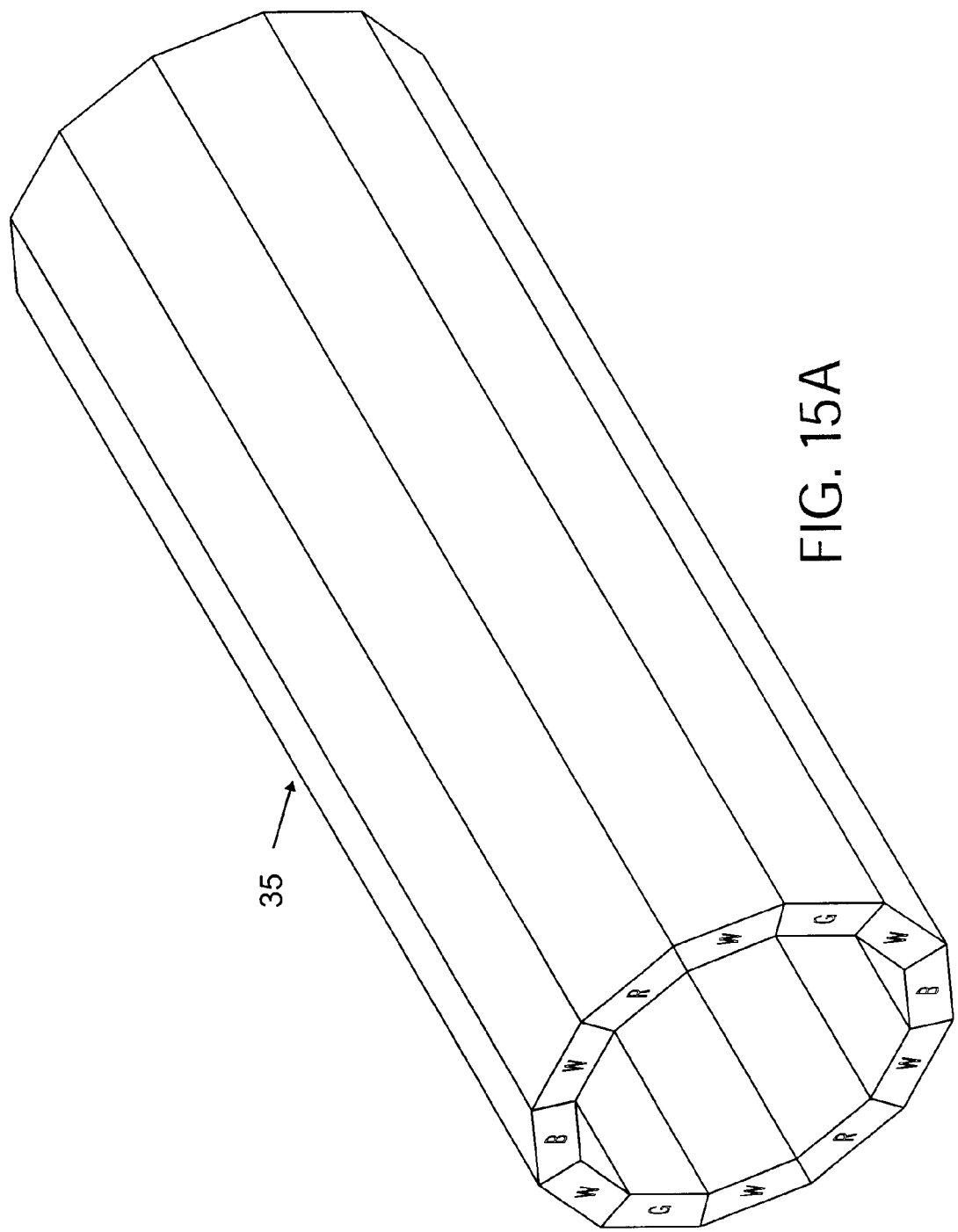
FIGS. 15A and 15B are three dimensional shapes that can be used in lieu of the sphere of FIG. 14.
Figure 15B:
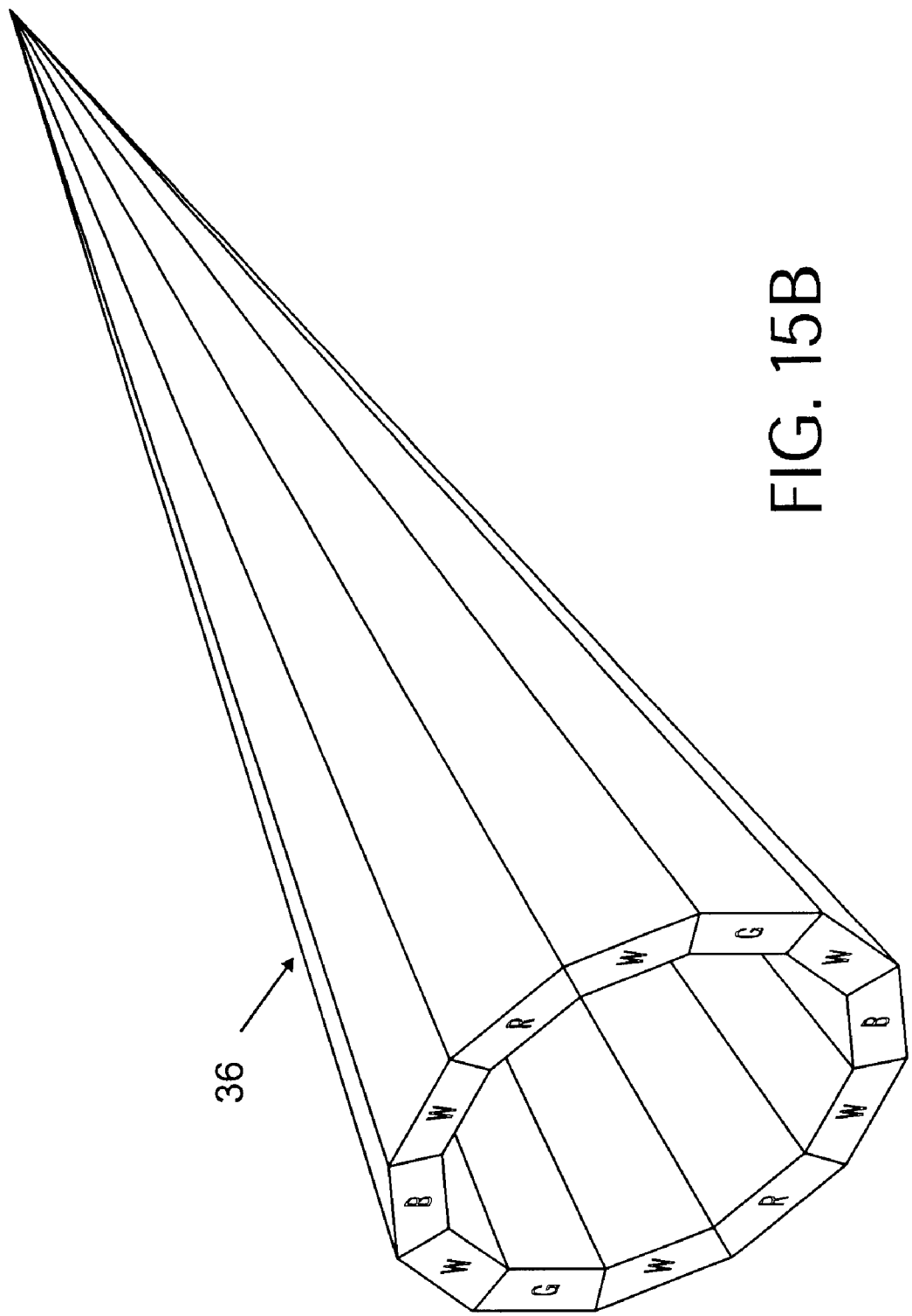

In a further embodiment of the invention, the color sequencing mechanism is not one or more color wheels, but rather a three dimensional object. The object can be a sphere 34, as illustrated in FIGS. 14A to 14f, or a cone, cylinder or other three dimensional object having bands, strips or sections of different colors. One example is illustrated in FIGS. 14A to 14F, where the front side of the sphere is shown in FIG. 14A, the back side of the same sphere is shown in FIG. 14B, and a cross section or the sphere is shown in FIG. 14C. As can be seen in FIG. 14A, the front side of the sphere has bands of color from the top to bottom of blue, white, red, white, green and white. As can be seen on the back side of the sphere in FIG. 14B, the color bands from top to bottom are white, green, white, red, white, blue. Therefore, it can be seen that the sphere as a whole comprises two bands each of red, green and blue, with white bands between every colored band. As with the multi color wheel embodiments described above, the output from the color sequencer can be white light half of the time if the light beam is transmitted through the front of the sphere in the order labeled 1 through 6 on the left of the sphere in FIG. 14A (red, white, green, white, blue, white) and is transmitted through the back of the sphere in the order labeled 1 through 6 in FIG. 14B (again—red, white, green, white, blue, white). By pivoting, rotating or translationally moving the sphere by a distance X, the light can pass through the front of the sphere in the order labeled 1 through 6 on the right of the sphere in FIG. 14A (white, red, white, green, white, blue) while not changing "phase" on the back of the sphere. In this way, full color saturation can be achieved. Of course the light source could be moved in order to achieve the same result. And, all points of brightness vs. color saturation between ½ white and full color saturation can be achieved by gradually moving or pivoting the ball until the full distance X is achieved. Of course, as with the color wheel embodiments, the white segments need not be of the same dimensions as the colored segments, and the white segments on one side of the ball need not be the same as the white segments on the other side. And, as noted previously, the same can be accomplished with other three dimensional objects (where the light passes through the color sequences at least twice (e.g. front and back of the sphere)—such as with a rotating cylinder 35 (FIG. 15A) or cone 36 (FIG. 15B), that can be a circle or dodecagon in cross section, or other filter(s) that result in light being filtered more than once, and, where through a positional change, the transmission/reflection of the light beam through a colored or white portion can be changed for one transmission/reflection relative to the other transmission/reflection. In this way, as with the multi-color wheel embodiments, the time allotted to white light in the color sequencing can be varied so as to increase or decrease the brightness of the image relative to color saturation. And, this can be easily performed via a simple mechanical change of the color sequencer and light beam relative to each other.

Figure 16A:
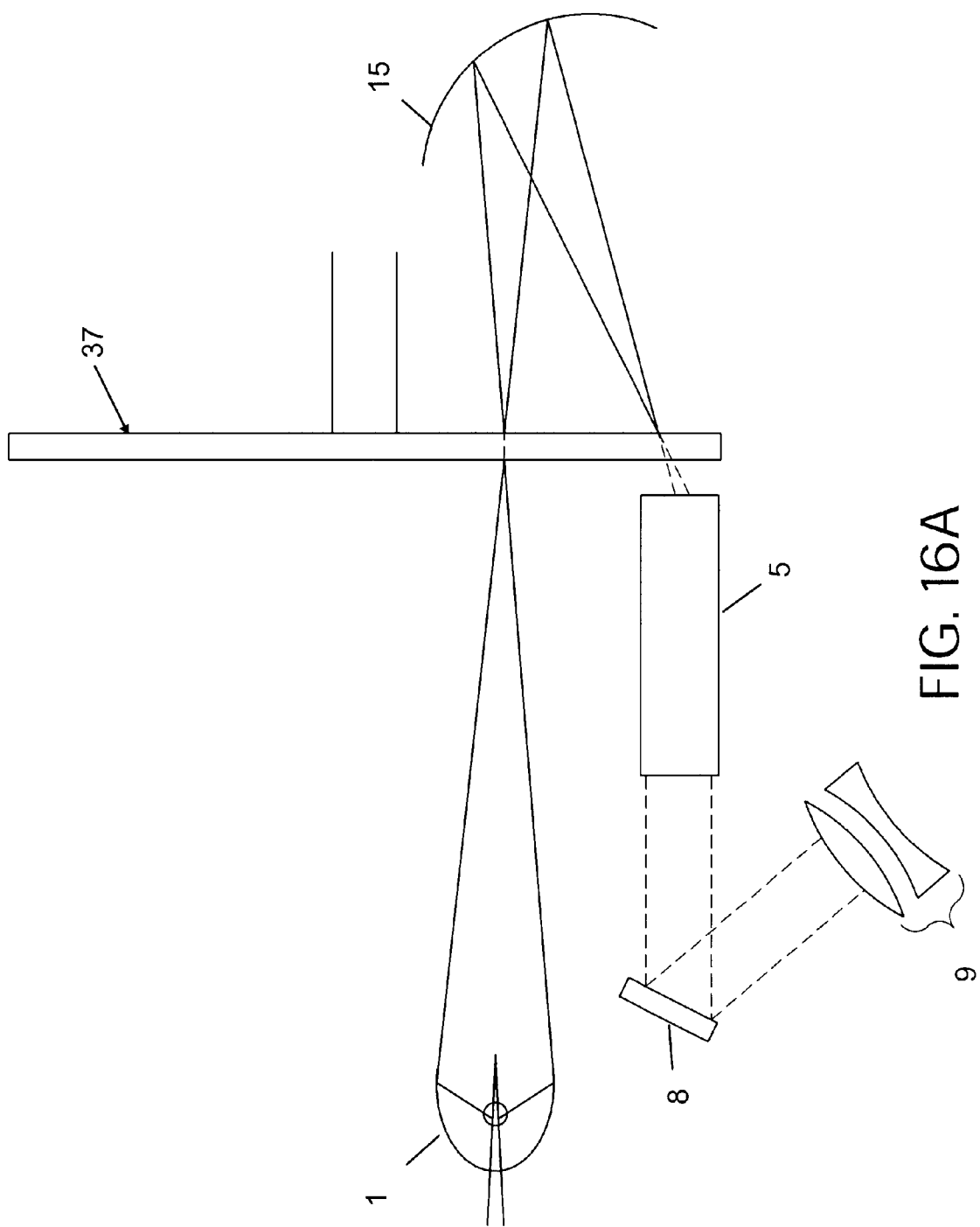
Figure 16B:
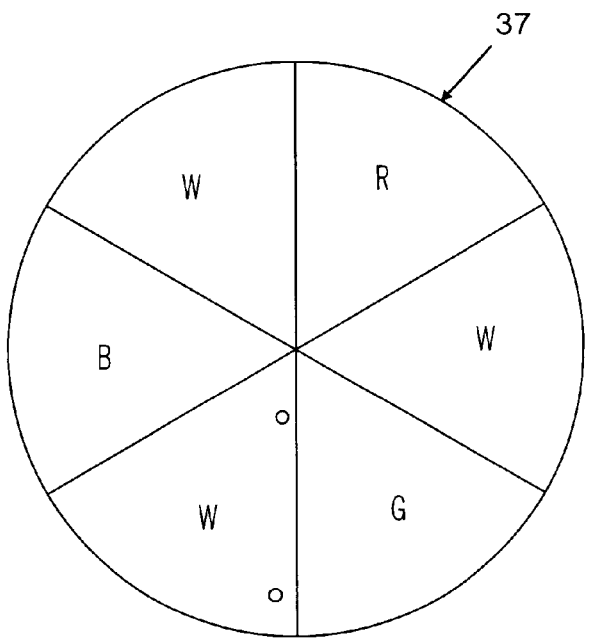
FIGS. 16B and 16C are on-axis views of a color wheel shifted in position in the system of FIG. 16A.
Figure 16C:
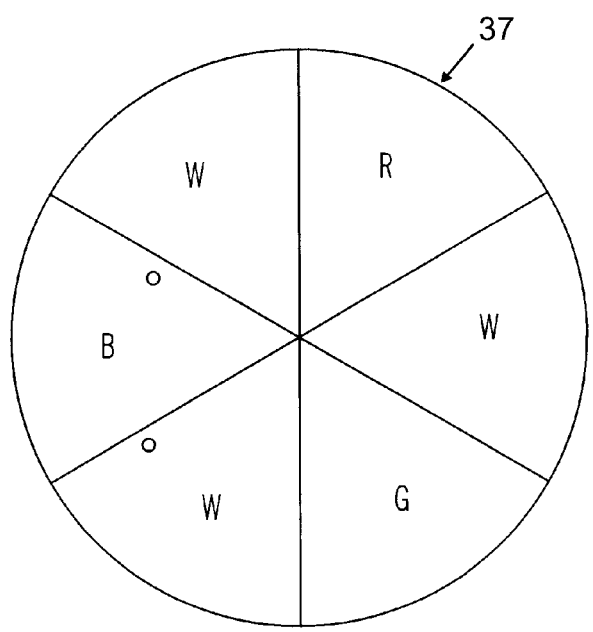

FIG. 16A is an illustration of a projection system having a light source 1, a single rotating color wheel 37, an off axis parabolic mirror 15, a light integrator 5, a spatial light modulator 8 and projection optics 9. The light from light source 1 passes twice through the rotating color wheel at points a and b so that the light from light source 1 is filtered twice. Depending upon the position of the color wheel 37, the light can be of high brightness but lower color saturation as in FIG. 16B (in this case the light is half white—or a percentage of white that depends upon the real estate allotted to the white segments). Or, as in FIG. 16C, full color saturation can be achieved simply by shifting the color wheel 37 in the direction of the arrow. Though it is preferred to shift the color wheel as mentioned above, the change in color saturation vs. brightness could also be achieved by shifting the light beam (and corresponding optics) while keeping the color wheel stationary.

Figure 17:
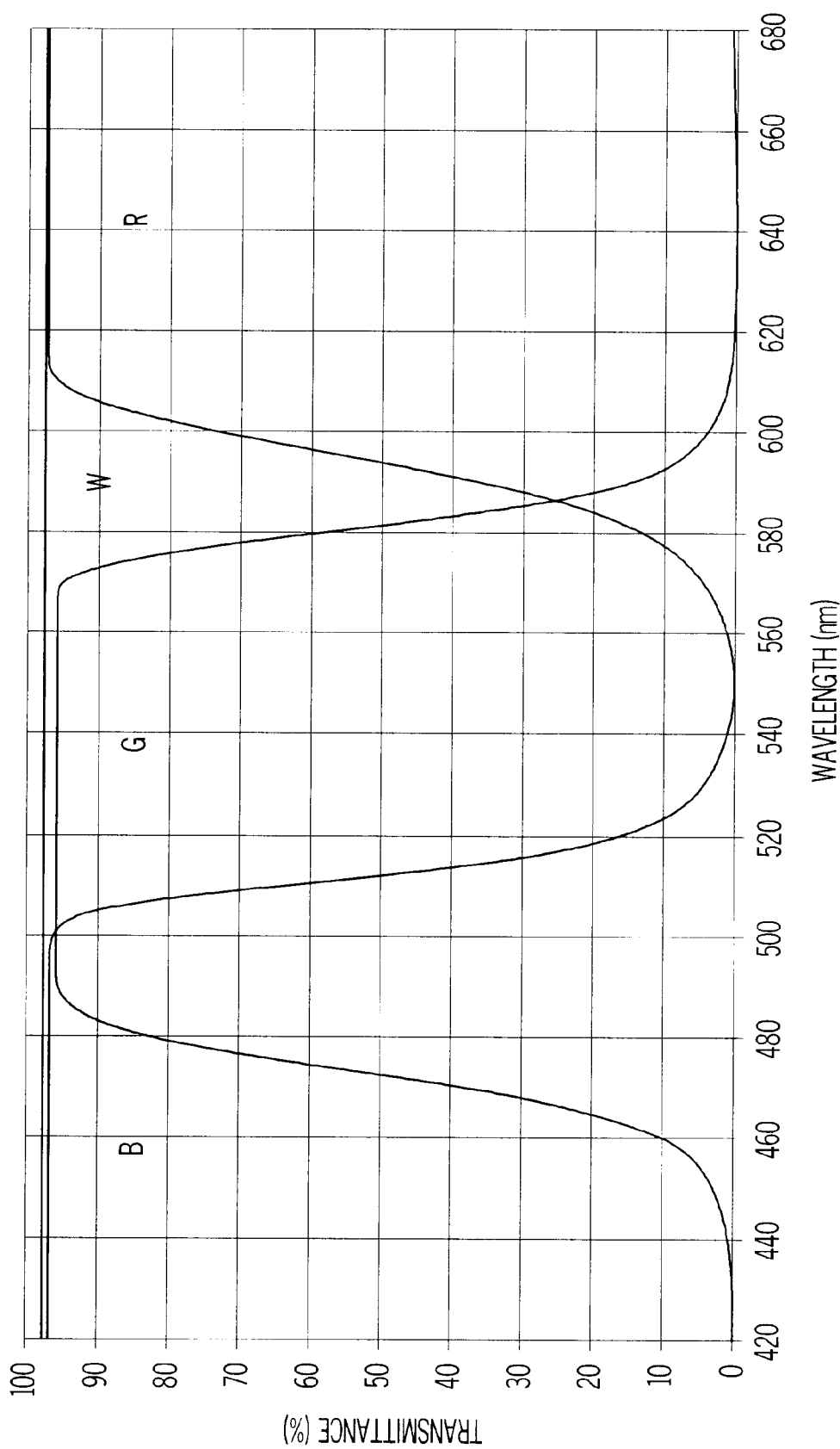
FIG. 17 is an illustration of the filtering characteristics of red, green, blue and white filters for one embodiment of the invention.

FIG. 17 is an example of spectral characteristics of the blue, green, red and white segments where such colors are used in the filter(s). Other filters could also be used in place of the color filters, and in place of the white filter, as mentioned hereinabove.

The invention has been described in terms of specific embodiments. Nevertheless, persons familiar with the field will appreciate that many variations exist in light of the embodiments described herein.

We claim:

1. A projection system comprising:

a light source for providing a light beam;

a spatial light modulator for transmitting or reflecting the light beam to a viewer or target; and two or more rotatable color filters provided within the path of the light beam so as to filter the light two or more times before reaching the spatial light modulator, the phase of the color filters being changable relative to the other or others so as to alter the brightness of the light that is incident on the spatial light modulator.

2. The projection system of claim 1, wherein the two or more color filters are two or more color wheels that are provided within the path of the light beam prior to the light beam being transmitted or reflected from the spatial light modulator.

3. The projection system of claim 2, wherein two or more color wheels are provided proximate to each other.

4. The projection system of claim 1, wherein the spatial light modulator is a liquid crystal display or a micromirror array.

5. The projection system of claim 1, further comprising a light pipe disposed within the path of the light beam prior to the light being transmitted or reflected by the spatial light modulator.

6. The projection system of claim 5, wherein the two or more color filters are provided proximate to the light pipe.

7. The projection system of claim 1, wherein two color filters are provided which overlap with each other at the location of the light beam.

8. The projection system of claim 7, wherein the color filters are color wheels having aligned axes of rotation.

9. The projection system of claim 8, wherein the color wheels are coaxial.

10. The projection system of claim 1, wherein each color wheel is connected to a corresponding motor via a drive shaft.

11. The projection system of claim 1, wherein at least one of the color filters is a color wheel having red, green and blue segments alternating with segments for changing a brightness of a color image formed by the projection system.

12. The projection system of claim 1, wherein the two or more color filters are provided within a single color wheel, the projection system further comprising one or more reflective elements for reflecting the light beam back through the single color wheel so that the light beam is filtered at least two times in the same color wheel.

13. The projection system of claim 1, wherein the light source is a source of white light selected from a UHP arc lamp, a halogen lamp, a white light laser.

14. The projection system of claim 13, wherein the two or more color filters are provided proximate to a converging point of light from the light source.

15. The projection system of claim 1, wherein the two or more color filters are two or more color wheels each connected via a drive shaft to a motor for rotating the corresponding color wheel through the light beam from the light source.

16. The projection system of claim 1, further comprising projection optics for projecting the light from the spatial light modulator to a viewer or target.

17. The projection system of claim 16, further comprising a target for receiving light from the projection optics.

18. The projection system of claim 17, which is a front or rear projection computer monitor or television.

19. A method for changing the brightness and/or color saturation of an image from a projection system, comprising:

providing a projection system having a light source, a spatial light modulator, sequentially moving light filters provided two or more times within a light beam from the light source so as to alter light due to the sequentially moving filters into a series of filtered light time segments over time for each sequence of movable light filters, and projection optics, the light source disposed for providing light incident on the spatial light modulator, and the projection optics disposed for receiving light from the spatial light modulator;

directing light from the light source through the projection optics via the spatial light modulator;

changing the brightness and color saturation by changing the movement of at least one sequence of moving light filters relative to at least one other sequence of moving light filters.

20. The method of claim 19, wherein each sequence of light filters is an individual color wheel.

21. The method of claim 20, wherein brightness of the projected image is changed by changing the phase of one rotating color wheel relative to another.

22. The method of claim 20, wherein each color wheel comprises a plurality of color segments and one or more segments for altering brightness and color saturation.

23. The method of claim 22, wherein the brightness and color saturation are changed by changing the phase of one color wheel relative to another color wheel.

24. The method of claim 22, wherein the one or more segments for changing brightness and color saturation are at least three white segments.

25. The method of claim 24, wherein the plurality of color segments comprise at least one each of red, green and blue.

26. The method of claim 25, wherein the sequence of filter segments around one wheel is the same as the sequence of another wheel.

27. The method of claim 19, wherein brightness is increased by coordinating segments for increasing brightness from each sequence of light filters to pass through the light beam at the same time.

28. The method of claim 19, wherein each sequence of light filters comprises a plurality of color filters, and wherein color saturation is increased by coordinating color filters from one series of light filters to pass through the light beam at the same time that segments for increasing brightness from another series of light filters passes through the light beam.

29. The method of claim 28, wherein each sequence of light filters comprises at least one red, green and blue filter, as well as at least three white segments.

30. The method of claim 19, wherein the sequentially moving light filters provided two or more times are provided by a single rotating color wheel.

31. The method of claim 30, further comprising passing the light beam through the rotating color wheel and reflecting the light back through another area of the color wheel.

32. The method of claim 31, wherein the brightness and color saturation are changed by changing the location where the light is first transmitted through the wheel and/or the light is reflected back through the wheel.

33. The method of claim 19, wherein a highest brightness sequence of light filters is available and a most color saturated sequence of light filters is available, and wherein a continuum of brightness vs. color saturation can be selected between the highest brightness sequence and the most color saturated sequence.

34. The method of claim 19, further comprising manually selecting a brightness vs. color saturation point by changing one series of color filters passing through the light beam relative to at least one other series.

35. A method for changing the brightness and/or color saturation of a projection system, comprising:

providing a projection system having a light source, a color sequencing device, a spatial light modulator, and projection optics, the light source disposed for providing white light, and the projection optics disposed for receiving light from the spatial light modulator;

directing light from the light source through the projection optics via the spatial light modulator and one or more color sequencing devices;

wherein the light from the light source is white light and the one or more color sequencing devices causes the white light to be divided into different colors and white light, with the different colors and white light being provided sequentially over time;

mechanically altering the position or phase of the one or more color sequencing devices so as to gradually increase or decrease the amount of time during which white light is reflected or transmitted from the one or more color sequencing devices to a target.

36. A method, comprising:

providing a projection system having a light source, a spatial light modulator, and projection optics, the light source disposed for providing white light or light having multiple wavelengths, and the projection optics disposed for receiving light from the spatial light modulator;

directing light from the light source through the projection optics via the spatial light modulator;

passing the light within the projection system through a first sequence of colors and white light and passing the sequenced light through a second sequence of colors and white light and so as to provide a) a sequence of red, green and blue, or b) a sequence of red, green and blue with white in between the red, green and blue, onto the spatial light modulator.

37. A method comprising:

providing a projection system having a light source, a spatial light modulator, and projection optics, the light source disposed for providing white or substantially white light, and the projection optics disposed for receiving light from the spatial light modulator;

directing the white light before or after being incident on the spatial light modulator through a color sequencer to result in light of different colors and light of higher brightness sequenced over time, the light of higher brightness selected from white, yellow, orange, light red, light green and light blue; and increasing color saturation by allotting less time to the light of higher brightness and more time to one or more of said different colors.

38. The method of claim 37, wherein the color saturation is increased via multiple steps.

39. The method of claim 37, wherein the color saturation is gradually increased from a minimum color saturation point to a maximum color saturation point.

40. The method of claim 37, wherein the color sequencer provides white, red, green and blue light.

41. The method of claim 40, wherein the time allotted to white light is decreased while the time allotted to one or more of the colors is increased to provide greater color saturation.

42. The method of claim 41, wherein white light is provided after every color after being passed through the color sequencer.

43. The method of claim 41, wherein the color sequencer is multiple series of light filters, each series passing through a light beam from the light source.

44. A method comprising:

directing light of multiple wavelengths from a light source;

dividing over time the light from the light source into time segments, the time segments including a plurality of different color segments and a plurality of brightness enhancing segments, the time segments being time sequentially projected onto a spatial light modulator;

projecting an image from the spatial light modulator on a target; and changing the time allotted to the brightness enhancing time segments that are projected onto the spatial light modulator so as to increase the brightness of the image projected onto the target.

* * * * *